(12) United States Patent
Yamagiwa

(10) Patent No.: US 7,152,779 B2
(45) Date of Patent: Dec. 26, 2006

(54) COMMODITY MANAGEMENT SYSTEM

(75) Inventor: Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 10/948,260

(22) Filed: Sep. 24, 2004

(65) Prior Publication Data

US 2005/0072842 A1 Apr. 7, 2005

(30) Foreign Application Priority Data

Oct. 1, 2003 (JP) .............................. 2003-343141

(51) Int. Cl.
*G06F 17/00* (2006.01)
(52) U.S. Cl. ...................................... 235/375; 235/487
(58) Field of Classification Search .................. 235/375
See application file for complete search history.

(56) References Cited

U.S. PATENT DOCUMENTS 5,521,815 A * 5/1996 Rose, Jr. ...................... 705/28

2004/0195306 A1 * 10/2004 Carlson ....................... 235/375

FOREIGN PATENT DOCUMENTS

| JP | 2000-263024 A | 9/2000 |
| JP | 2002-337662 A | 11/2002 |

* cited by examiner

*Primary Examiner*—Daniel Stcyr
(74) *Attorney, Agent, or Firm*—Birch, Stewart, Kolasch & Birch, LLP

(57) ABSTRACT

A commodity management system can manage information on commodities and commodity owners from sale times to disposal times and can identify a new owner in a disposal/recycling procedure. In an IC tag embedded in a motorcycle, management information associating the motorcycle and its owner is stored. A management card for recording the same management information is issued to a purchaser of the motorcycle. When the motorcycle is disposed and recycled, the dealer transmits a request for authentication of the owner to a management server. The management server then allows a disposal/recording procedure only if the management information stored in the IC tag embedded in the motorcycle matches the management information recorded in the management card.

20 Claims, 14 Drawing Sheets

FIG. 9

VEHICLE HISTORY DATA
(VEHICLE INFORMATION DATABASE 15)

| VEHICLE ID | XXXXXXX | |
|---|---|---|
| DATE | HISTORY OUTLINE | DETAILS |
| MONTH DAY, YEAR | NEW CAR ASSEMBLY | *** TECHNOLOGICAL RESEARCH COMPANY, ## FACTORY |
| MONTH DAY, YEAR | OWNER REGISTRATION | OWNER NAME: XXXX, ADDRESS: XXXXXX |
| MONTH DAY, YEAR | REFUELING | GAS-FILLING STATION: XXXX, FUELING AMOUNT: XX LITERS |
| MONTH DAY, YEAR | REFUELING | GAS-FILLING STATION: XXXX, FUELING AMOUNT: XX LITERS |
| MONTH DAY, YEAR | REFUELING | GAS-FILLING STATION: XXXX, FUELING AMOUNT: XX LITERS |
| MONTH DAY, YEAR | REPAIR | REPAIR SHOP: XXXX, REPAIR SUBSTANCE: XXXX |
| MONTH DAY, YEAR | REFUELING | GAS-FILLING STATION: XXXX, FUELING AMOUNT: XX LITERS |
| MONTH DAY, YEAR | OWNER CHANGE | OWNER NAME: XXXX, ADDRESS: XXXXXX |
| ......... | ......... | ......... |
| MONTH DAY, YEAR | REGISTRATION ERASURE | |
| MONTH DAY, YEAR | WASTE MANAGEMENT MANIFEST ISSUANCE | |
| MONTH DAY, YEAR | | |
| MONTH DAY, YEAR | | |
| MONTH DAY, YEAR | | |
| MONTH DAY, YEAR | | |

COMMODITY MANAGEMENT SYSTEM

CROSS-REFERENCE TO RELATED APPLICATIONS

This nonprovisional application claims priority under 35 U.S.C. § 119(a) on Patent Application No. 2003-343141, filed in Japan on Oct. 1, 2003, the entirety of which is incorporated herein by reference.

BACKGROUND OF THE INVENTION

1. Field of the Invention

The present invention relates to a commodity management system for managing commodities, which are purchased by consumers, from commodity-selling times to commodity disposal times.

2. Description of Background Art

Efficient utilization of resources by recycling disposed products including vehicles and home electrical appliances has been proposed recently. To implement the recycling of disposed products, a system has been studied. This system includes writing recycling information of a product into an IC tag at a disposal time and attaching the tag to the disposed product at a dealer (see, for example, Japanese Patent Laid-Open No. 2000-263024, paragraph numbers [0022] and [0034] and FIG. 1).

The IC tag is a device allowing data to be written therein and data already stored therein to be read out in a non-contact way by using radio communication technology. In the case of the example described above, recycling information of a disposed product includes information on the consumer using the product, a recycling fee, data required to disassemble the product and data of the dealer selling the product. An inquiry about the recycling fee and the data required to disassemble the product can be made by fetching a product number attached on the product and transmitting the product number to a management center. By using this system, it is possible to prevent a disposed product from being lost in the course of a recycling process and a product from being dumped illegally.

In addition, a system for attaching an IC tag to each motorcycle to avoid thefts of motorcycles has also been studied (see, for example, Japanese Patent Laid-Open No. 2002-337662, paragraph numbers [0019] and [0022] and FIG. 1). A code assigned to each motorcycle is stored in advance in the IC tag. The dealer transmits information on the purchaser to a management center at a purchasing time of a motorcycle. The management center creates a database associating a code assigned to a motorcycle with information on the owner of the motorcycle. If a dubious motorcycle is detected, a code assigned to the motorcycle is read out from the IC tag by using an IC-tag reader and, by transmitting an inquiry specifying the code to the management center, it is possible to determine whether or not the dubious motorcycle is a stolen one.

With the method of writing recycling information into an IC tag at a disposal time, however, it is impossible to confirm that a person executing a procedure for disposing a commodity is the true owner of the commodity. It is thus quite within the bounds of possibility that the disposal procedure for a commodity is executed against the will of the owner of the commodity, and a procedure is executed for disposing a wrong commodity. In addition, even by transmitting an inquiry specifying a code assigned to a commodity, it is difficult to determine whether or not a person executing a procedure for disposing the commodity is the true owner of the commodity. In particular, if a used commodity is resold to another owner, it becomes impossible to determine the true owner of the commodity.

SUMMARY OF THE INVENTION

It is thus an object of the present invention addressing the problems described above to manage information on commodities and information on owners of the commodities with a high degree of reliability from commodity-selling times to commodity disposal times.

In accordance with as first aspect of the present invention addressing the problems described above, there is provided a commodity management system (such as a commodity management system 1 provided by an embodiment) for managing commodities (such as a motorcycle 2 provided by the embodiment), which are purchased by consumers, from commodity-selling times to commodity disposal times. The commodity management system includes authentication means (such as authentication means 64 provided by the embodiment) for reading out management information (such as a vehicle ID and owner data, which are provided by the embodiment) stored in a management card (such as a management card 20 provided by the embodiment) issued at a commodity-selling time of a commodity as well as management information recorded at the commodity-selling time in a storage device (such as an IC memory 12 provided by the embodiment) provided for the commodity and carrying out authentication by comparing the management information read out from the management card with the management information read out from the storage device. The commodity management system executes the step (such as a step S28 provided by the embodiment) of outputting information allowing a disposal and recycling procedure for a commodity having management information matching the management information stored in the management card.

This commodity management system catalogs management information in an information-processing apparatus of a commodity manufacturer at a commodity-selling time and stores management information in a storage device of an IC tag attached to the commodity. In addition, the commodity management system issues a management card containing the same management information to the commodity purchaser (owner). When the purchaser disposes and/or recycles the commodity, the management information on the commodity side is compared with the management information stored in the management card and a disposal and recycling procedure is allowed only if the two pieces of management information match each other. Thus, a person other than the true owner of the commodity is not capable of executing the disposal procedure. It is to be noted that the management information can be any data as long as the data associates a commodity with the owner of the commodity.

In accordance with a second aspect of the present invention, the commodity management system according to the first aspect further includes the authentication means being included in the information-processing apparatus (such as a management server 4 provided by the embodiment) of the commodity manufacturer manufacturing the commodity.

In accordance with this commodity management system, the commodity manufacturer controls the authentication means. Thus, information required for authentication, a sales history, information on the owner of the commodity are collectively managed.

In accordance with a third aspect of the present invention, the commodity management system according to the first and second aspects includes the commodity being a vehicle.

In accordance with this commodity management system, the owner is authenticated at a vehicle-disposing or recycling time. In this case, the vehicle means a two-wheel car, a three-wheel car and a four-wheel car.

In accordance with a fourth aspect of the present invention, there is provided a commodity management system wherein a label showing that the purchaser of a commodity has paid a disposal and recycling fee for the commodity is attached to the commodity at the time the purchaser purchases the commodity, and commodities purchased by consumers are managed from commodity-selling times to commodity disposal times. The commodity management system includes authentication means for reading out management information stored in a management card issued at a commodity-selling time of a commodity as well as management information shown on the label attached to the commodity and carrying out authentication by comparing the management information read out from the management card with the management information of the commodity. The commodity management system outputs information allowing a disposal and recycling procedure without issuing a request for a disposal and recycling fee for a commodity having management information matching the management information stored in the management card. The commodity management system issues a notification requesting a disposal and recycling fee for a commodity not authenticated successfully or a commodity having no label described above.

The commodity management system manages commodities by using labels attached to the commodities and management cards issued at purchasing times of the commodities. If it is authenticated that management information stored in the management card matches the management information shown on the label, a disposal and recycling procedure can be executed without issuing a new request for a disposal and recycling fee because a result of the authentication indicates that the owner of the commodity has already paid a fee required for disposal and recycling of the commodity. If the authentication fails or a commodity has no label described above, on the other hand, a request for a disposal and recycling fee for the commodity is issued to a person making a request for disposal and recycling of the commodity because the person has not paid the disposal and recycling fee.

In accordance with the first aspect of the present invention, a procedure for disposing and recycling a commodity is authenticated by using management information stored in the commodity at the commodity-selling time and management information recorded in a management card issued to the owner of the commodity also at the commodity-selling time. Thus, a commodity can be disposed and recycled only at a request made by an authenticated owner. In addition, by using the management information stored in a commodity, it is possible to easily find a stolen commodity.

In accordance with the second aspect of the present invention, the commodity manufacturer collectively manages information required for authentication, a sales history and information on the owner of the commodity. Therefore, a commodity can be disposed and recycled quickly and correctly.

In accordance with the third aspect of the present invention, at a vehicle-disposing and recycling time, the owner of the vehicle is authenticated. In addition to the effects described above, the third aspect of the present invention avoids and discourages vehicle thefts since a stolen vehicle cannot be disposed.

In accordance with the third aspect of the present invention, if the owner of a commodity is authenticated as a person who already paid a fee required for disposal and recycling of the commodity, at a purchasing time of the commodity, the commodity can be disposed and recycled without issuing a new request for a disposal and recycling fee to the owner. Owners failing the authentication process are each requested to pay a commodity-disposing and recycling fee. Since it is possible to reliably determine whether or not a commodity-disposing and recycling fee has been paid, a commodity-disposing and recycling fee can be collected with a high degree of reliability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a diagram showing the data structure of a vehicle history data included in the vehicle-information database;

DETAILED DESCRIPTION OF THE PREFERRED EMBODIMENTS

Figure 1:
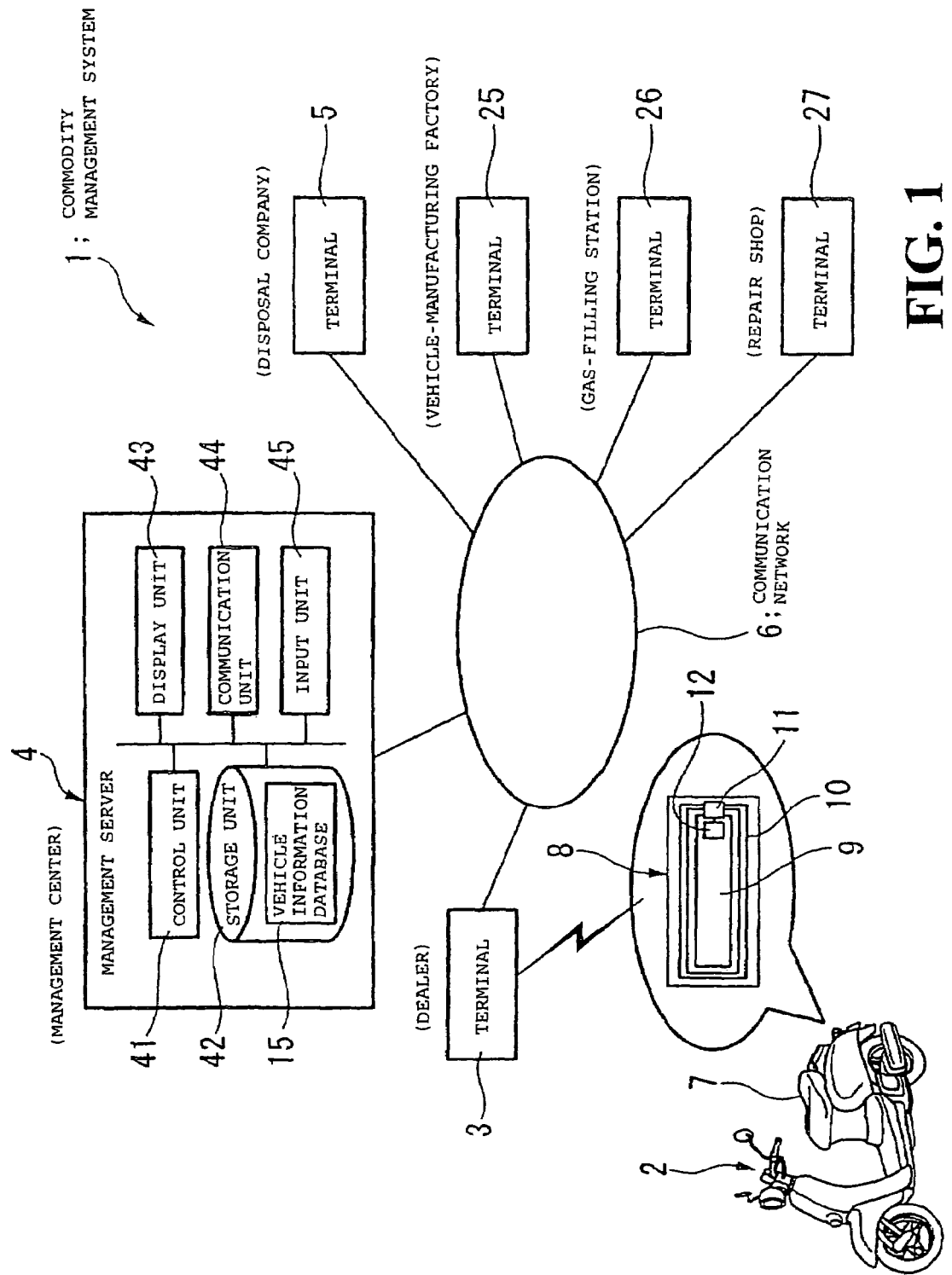
FIG. 1 is a diagram showing the overall configuration of a commodity management system implemented by an embodiment of the present invention.

The present invention will now we described with reference to the accompanying drawings, wherein the same or similar elements have been identified by the same reference numeral throughout the several views.

FIG. 1 is a diagram showing an outline of a first embodiment implementing a commodity management system wherein the handled commodity is a motorcycle and the consumer is the owner of the purchased motorcycle. As shown in FIG. 1, a commodity management system 1 has a configuration for connecting a terminal 3 of a dealer selling motorcycles 2 to a management server 4 of a management center through a communication network 6. The commodity management system 1 also connects terminals 5, 25, 26 and 27 of a motorcycle disposal company, a motorcycle recycler (collectively referred to as a motorcycle disposal company in the following description) to the management server 4 through the communication network 6. In addition, the motorcycle 2 on the vehicle side is provided with information for identifying the motorcycle 2 whereas the motorcycle owner on the owner side is provided with information for identifying the motorcycle owner. On the basis of these pieces of information, the management server 4 authenticates a disposal and recycling procedure (also referred to as a disposal/recycling procedure in the following description) for the owner and allows the procedure to be executed only for an owner confirmed to be the true owner.

On the motorcycle 2, an IC tag 8 is mounted as a device used for identifying the motorcycle 2 and its owner by adoption of an automatic recognition technology based on radio communication (for example, RFID (Radio Frequency IDentification) technique). The IC tag 8 has a resin board 9, on which an antenna 10 is formed as a device for communicating with external devices. On the resin board 9, a control circuit 11, which is connected to the antenna 10, and an IC memory 12 are mounted. The control circuit 11 writes and reads information into and from the IC memory 12.

Figure 2:
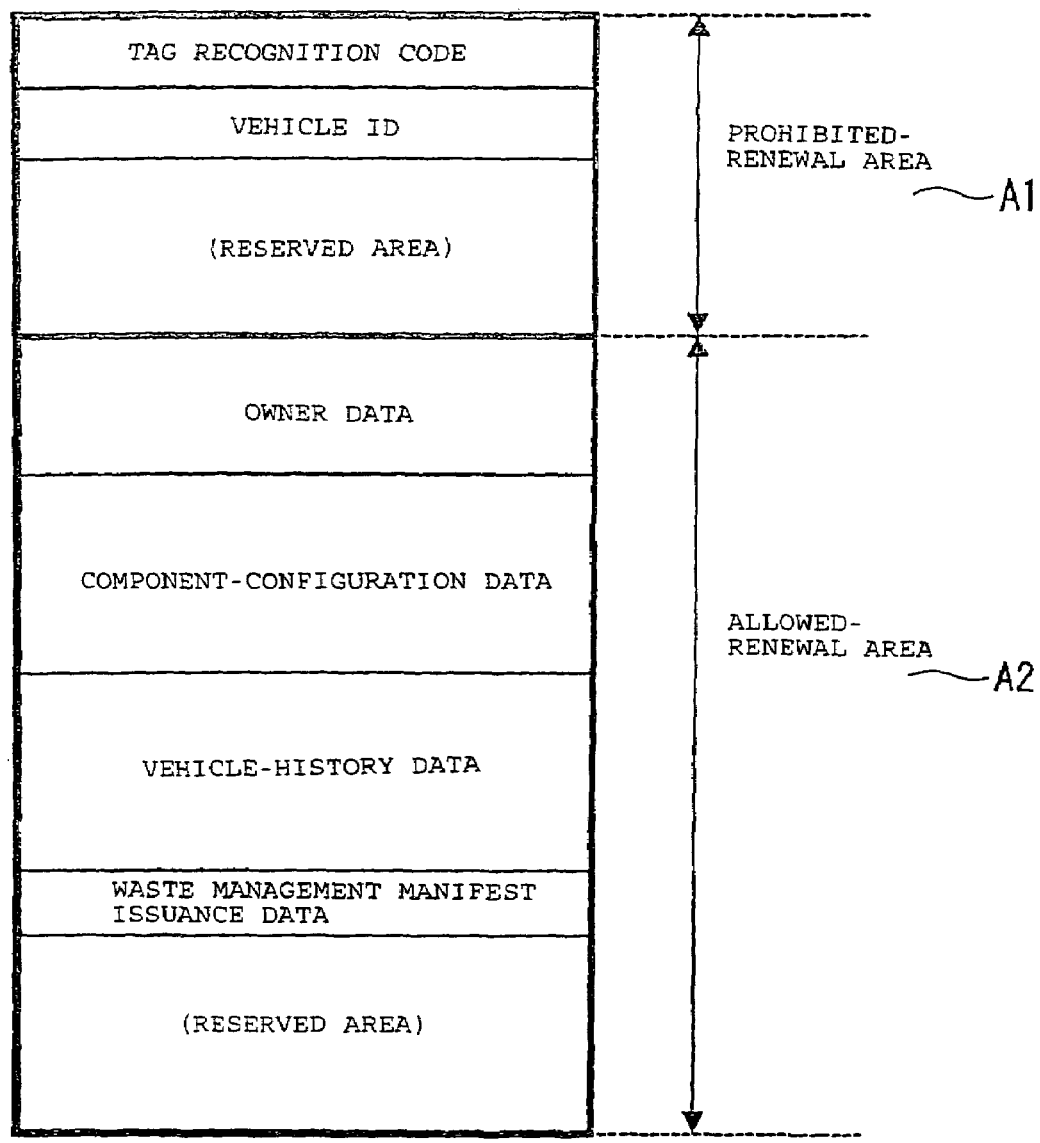
FIG. 2 is a diagram showing a layout of data stored in an IC memory of an IC tag.

As shown in FIG. 2, the IC memory 12 includes a prohibited-renewal area A1 and an allowed-renewal area A2.

The prohibited-renewal area A1 is used for storing a tag recognition code of the IC tag 8 and a vehicle ID. The prohibited-renewal area A1 also includes a reserved area. The tag recognition code is information for recognizing the type of the IC tag 8. That is, the tag recognition code indicates that the IC tag 8 is the IC tag appended to the motorcycle 2. The vehicle ID is information for uniquely recognizing the motorcycle 2. Typically, the vehicle ID is an arbitrary number, or a number obtained by combining the model number with the manufacturing serial number of the motorcycle 2. It is to be noted that the prohibited-renewal area A1 is typically a ROM (Read Only Memory), and is controlled by the control circuit 11 so that data stored in the prohibited-renewal area A1 cannot be renewed.

The allowed-renewal area A2 stores owner data, component configuration data, a vehicle history data and waste management manifest issuance data. The allowed-renewal area A2 also includes a reserved area. The owner data includes the name, birth date and address of the user who is the owner of the motorcycle 2. The component configuration data is information on components composing the motorcycle 2. The vehicle history data is information chronologically recording the history of the motorcycle 2 in the time frame from the manufacturing to the disposal. The waste management manifest issuance data is information to be used at a disposal/recycling time of the motorcycle 2. It is to be noted that the component configuration data, the vehicle history data and the waste management manifest issuance data correspond to the whole of a vehicle-information database 15 of the management server 4 to be described later or only a portion of the vehicle-information database 15, which is shown in FIG. 1.

Typically, the IC tag 8 like the one shown in FIG. 1 is installed inside a seat unit 7 of the motorcycle 2.

Figure 3:
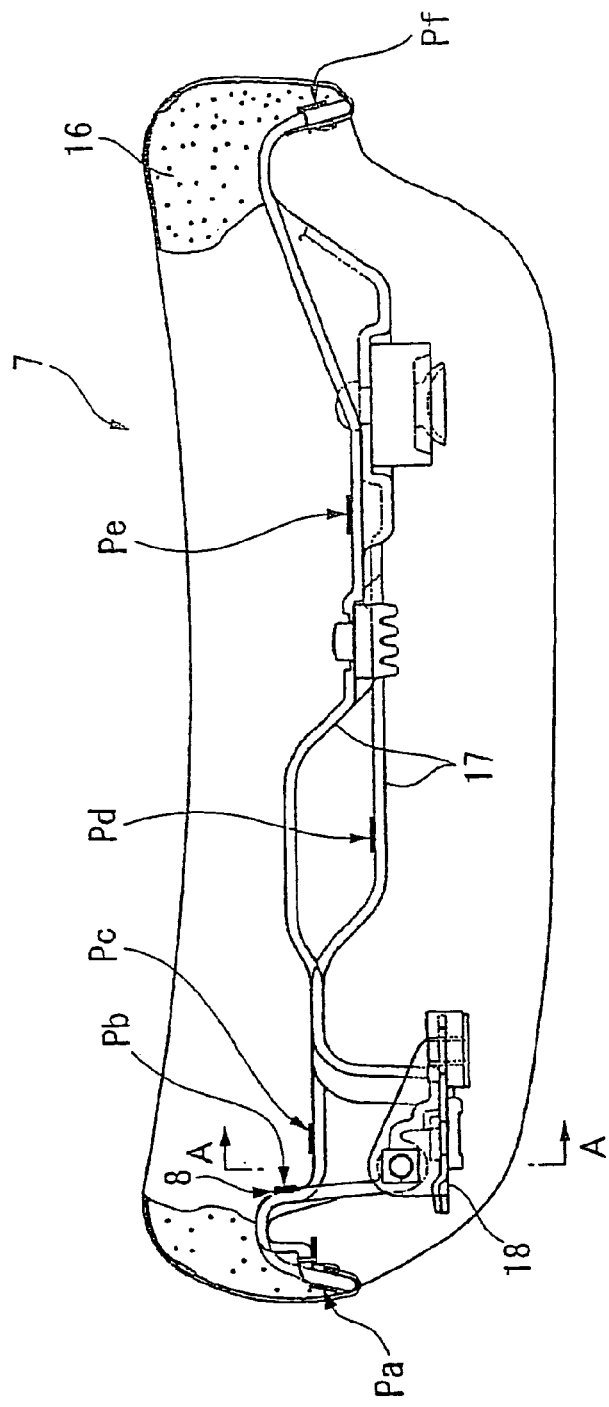
FIG. 3 is an explanatory diagram showing locations at which the IC tag can be installed.

As shown in FIG. 3, the seat unit 7 has a configuration wherein a bottom plate 17 supports the lower portion of a sitting seat 16 on which the owner sits. The seat unit 7 is swingably held on a frame on the vehicle-body side by a hinge mechanism 18 attached on the front side of the bottom plate 17. The IC tag 8 is installed at any one of positions Pa, Pb, Pc, Pd, Pe and Pf on the bottom plate 17. By placing the IC tag 8 at such a position, the IC tag 8 is sandwiched by the sitting seat 16 and the bottom plate 17. This configuration thus offers a merit that a person can hardly touch the IC tag 8. This configuration offers another merit that an electric wave is capable of passing through the sitting seat 16 since the sitting seat 16 is made of resin or the like. More desirable positions for installing the IC tag 8 are positions Pa and Pf. Position Pa is the front-side edge of the bottom plate 17 whereas position Pf is the rear-side edge of the bottom plate 17. By placing the IC tag 8 at either of these more desirable positions, the distance between the sheet surface and the IC tag 8 becomes shorter. Thus, information can be written into and read out from the IC tag 8 with ease. In addition to the positions inside the seat unit 7, the IC tag 8 can also be installed inside a rear-view mirror, inside a device for monitoring the pressure of air inside a tire or inside a vehicle meter.

Figure 4:
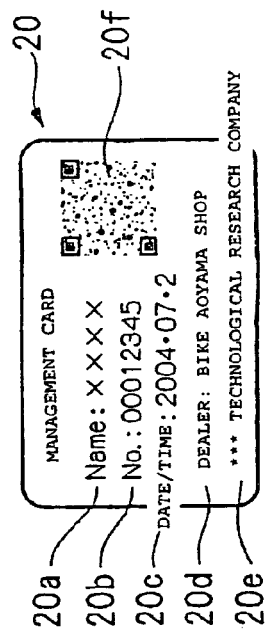
FIG. 4 is a diagram showing a management card.

As means for indicating that the owner is the true owner of the motorcycle 2, a management card 20 like one shown in FIG. 4 is issued to the owner. The management card 20 has a row 20*a* for showing the name of the owner, a row 20*b* for showing the vehicle ID of the purchased motorcycle, a row 20*c* for showing purchasing date, a row 20*d* for showing the name of a dealer, a row 20*e* for showing the manufacturer and a management-information area 20*f* for recording information required for authenticating the owner (management information) in a state allowing the information to be read out by a generally known reader. The management information includes the owner data and the vehicle ID, which are recorded in the management-information area 20*f* in the form of a two-dimensional code or a barcode. It is to be noted that, in place of these codes, an RFID can also be used. The management card 20 is issued at the terminal 3 (see FIG. 1) of the dealer at the time the motorcycle 2 is purchased.

Figures 5, 6, 7:
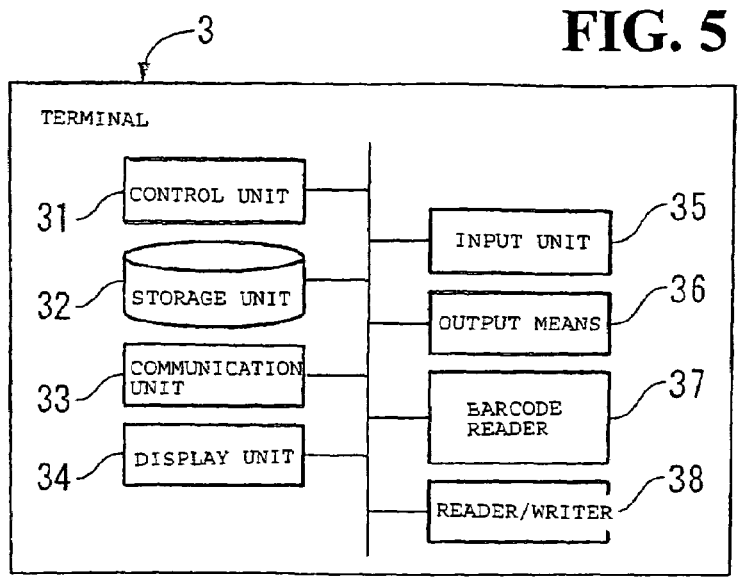
FIG. 5 is a diagram showing the configuration of the terminal of a dealer.
FIG. 6 is a diagram showing a dealer card.
FIG. 7 is a diagram showing the data structure of owner data included in a vehicle-information database.

As shown in FIGS. 1 and 5, the dealer terminal 3 includes a control unit 31, a storage unit 32, a communication unit 33, a display unit 34, an input unit 35, output means 36, a barcode reader 37 and a reader/writer 38. The control unit 31 has a CPU. The communication unit 33 is a component for controlling network communications. The input unit 35 includes a keyboard. The output means 36 has a printer for issuing the management card 20 (see FIG. 4). The barcode reader 37 is a component for reading out information from the management-information area 20*f* (see FIG. 4). The reader/writer 38 is a component for reading out information and writing information from and into the IC tag 8. The reader/writer 38 includes an antenna with a shape resembling a coil and a transmitting/receiving unit connected to the antenna. The antenna is used as a component for communicating with the IC tag 8. The antenna and the transmitting/receiving unit are not shown in the figure. The storage unit 32 is a memory for storing various kinds of data and a variety of programs. The data stored in the storage unit 32 includes dealer IDs each assigned to a dealer. The control unit 31 executes predetermined programs to carry out various kinds of processing. The control unit 31 also acquires various kinds of information to function as means for requesting the management server 4 to carry out an authentication process and means for issuing a management card.

A dealer ID for identifying a dealer can be issued for each dealer or each sales person in every dealer and stored in a card. An example of such a card is shown in FIG. 6.

As shown in FIG. 6, the dealer card 39 includes a row 39a for showing the name of a sales person, a row 39b for showing a dealer ID, a row 39c for showing the area of the dealer, a row 39d for showing the name of the dealer, an area 39e for sticking a picture of the sales person and an area 39f for sticking an IC tag. The IC tag on the area 39f has the same configuration as the aforementioned IC tag 8 of the motorcycle 2. In its memory, information including the dealer ID is stored. Information in the IC tag on the area 39f can be read out by the reader/writer 38 employed in the terminal 3 as shown in FIG. 5. It is to be noted that the dealer can be a dealer selling new vehicles or a dealer selling used ones. In addition, information on dealers is managed along with information on motorcycles 2 and information on the owner of the motorcycles 2 by the management server 4 employed in the management center (see FIG. 1).

The management center shown in FIG. 1 is managed by the manufacturer of the motorcycle 2 to play the role of a management and authentication facilities for various kinds of information. The management server 4 of the management center is a computer including a control unit 41, a storage unit 42, a communication unit 44, a display unit 43 and an input unit 45. The control unit 41 includes a CPU. The storage unit 42 is a memory for storing various kinds of data and a variety of programs. The communication unit 44 is a component for controlling network communications. The input unit 45 includes a keyboard. In the storage unit 42, a vehicle-information database 15 is created.

The vehicle-information database 15 is explained by referring to FIGS. 7 to 10 as follows.

FIG. 7 is a diagram showing a typical data structure of the owner data included in the vehicle-information database 15. As shown in the figure, the owner data has a data structure including information such as the name, birth date and address of each owner that is associated with a vehicle ID.

Figure 8:
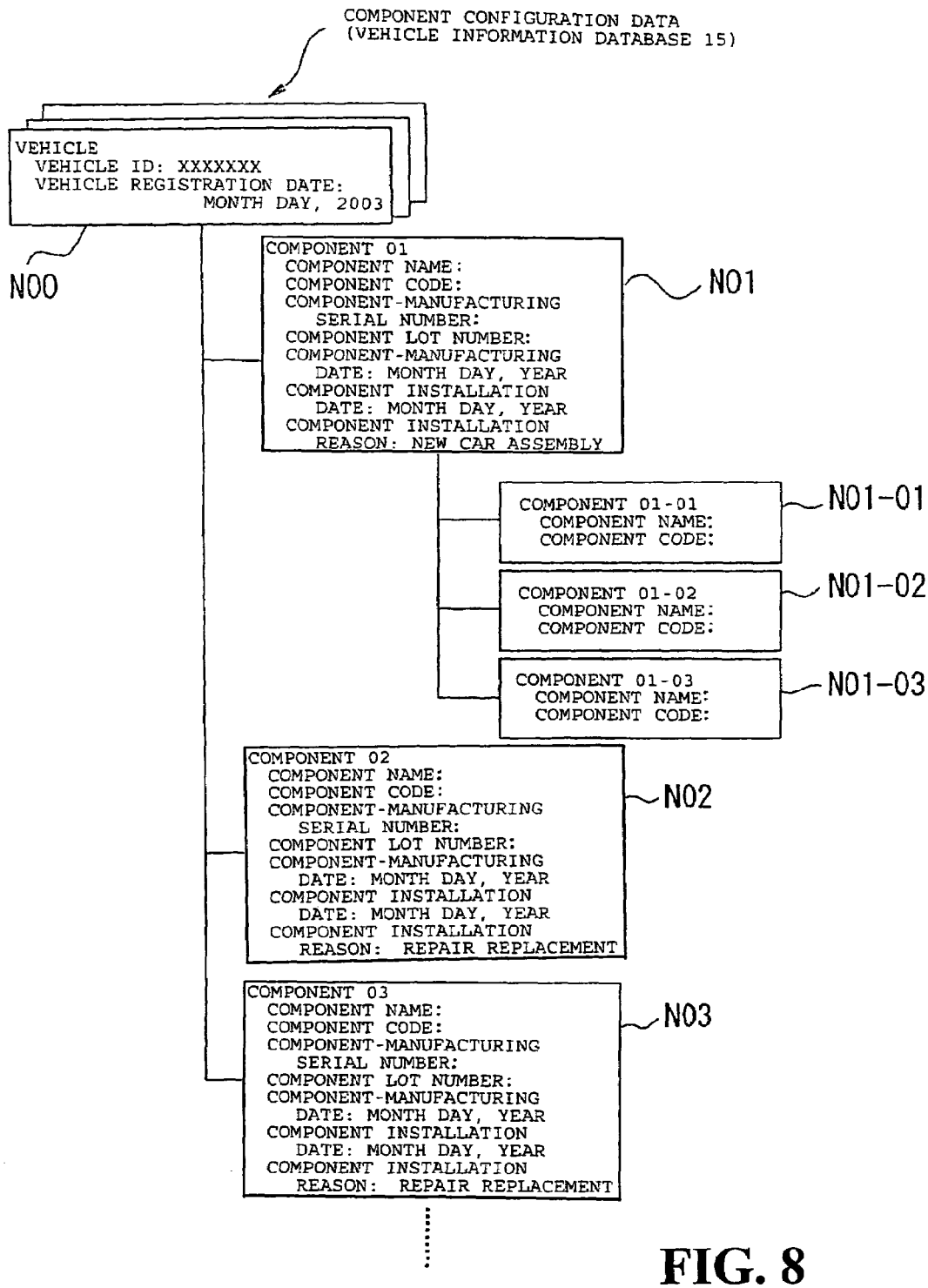
FIG. 8 is a diagram showing the data structure of component data included in the vehicle-information database.

FIG. 8 is a diagram showing a typical data structure of component configuration data included in the vehicle-information database 15. As shown in the figure, the component configuration data has a tree structure showing information on a component configuration for each vehicle ID. At node N00 corresponding to data on the first hierarchical layer, data such as the vehicle ID and vehicle-registration date of the motorcycle 2 is stored. The motorcycle 2 includes a plurality of components, namely, components 01, 02, 03 and so on. Information on these components is stored at any one of nodes N01, N02, N03 and so on corresponding to data on the second hierarchical layer. If each of components 01, 02, 03 and so on includes a plurality of sub-components, a hierarchical structure is created for each of the sub-components. Assume for example that component 01 includes sub-components 01-01, 01-02, 01-03 and so on. In this case, information on these sub-components is stored at any one of nodes N01-01, N01-02, N01-03 and so on. Information stored at each of nodes N01, N02, N03 and so on as well as nodes N01-01, N01-02, N01-03 and so on includes a component name, a component code, a component-manufacturing serial number, a component lot number, a component-manufacturing date, a component installation date and a component installation reason. The component name indicates the name of the component. The component code is a code for identifying the type of the component. The component-manufacturing serial number is a serial number assigned to each of the components. The component lot number is the number of a lot at which the component was manufactured. The component-manufacturing date is a date on which the component was manufactured. The component installation date is a date on which the component was installed in the vehicle. Alternatively, the component installation date is a date on which the sub-component was installed in the component that is at a higher layer. The component installation reason is a reason why the component was installed in the vehicle. (Examples of the reason are "assembly of a new vehicle" and "repair replacement".) It is to be noted that, even though the typical data structure shown in FIG. 8 includes only three hierarchical layers, in actuality, any number of hierarchical layers can be created.

FIG. 9 is a diagram showing a typical data structure of a vehicle history data included in the vehicle-information database 15. As shown in the figure, the vehicle history data stores history information for every vehicle (every vehicle ID). The vehicle history data at least includes data such as date and details of a history outline. Examples of the history outline are assembly of a new vehicle, registration of the vehicle owner, a change in vehicle owner, refueling, repair, registration erasure and waste management manifest issuance. The control unit 41 (see FIG. 1) updates this history information every time an event occurs. If the outline of an event is assembly of a new vehicle, details of the event describe the name of the vehicle manufacturer and the name of the factory. If the outline of an event is registration of the vehicle owner, details of the event include the name and address of the vehicle owner. If the outline of an event is refueling, details of the event include information identifying the gas-filling station, a fueling amount and a mileage at the refueling time. If the outline of an event is a change in vehicle owner, details of the event include the name and address of a new vehicle owner.

Figure 10:
FIG. 10 is a diagram showing a typical data structure of waste management manifest issuance data included in the vehicle-information database.

FIG. 10 is a diagram showing a typical data structure of waste management manifest issuance data included in the vehicle-information database 15. It is to be noted that disposal companies are classified into four categories, i.e., a disposal-accepting company, a collection/transportation company, an intermediate-processing company and a final-processing company.

As shown in the figure, waste management manifest issuance data is created for every vehicle (every vehicle ID). The waste management manifest issuance data includes a waste management manifest issuance completion flag and a waste-processing code. In addition, the waste management manifest issuance data also includes information on a disposal-accepting company (disposal-accepting company information) and a public key of the disposal-accepting company that are associated with each other. The information on the disposal-accepting company and the public key of the disposal-accepting company are followed by information and public keys for a collection/transportation company, an intermediate-processing company and a final-processing company. The waste management manifest issuance completion flag is a flag indicating whether or not a waste management manifest has been issued. The waste-processing code is a code indicating whether the waste management manifest has been issued by using a paper medium or an electronic medium. It is to be noted that the terminal 5 employed in the disposal company (see FIG. 1) holds a secret key for each of the public keys. In dependence on the substance of the processing, there may be a plurality of companies in every company category (for example, the category of the intermediate-processing company). In this case, company information and a public key associated with each other are included in the waste management manifest issuance data for each of the companies.

Figure 11:
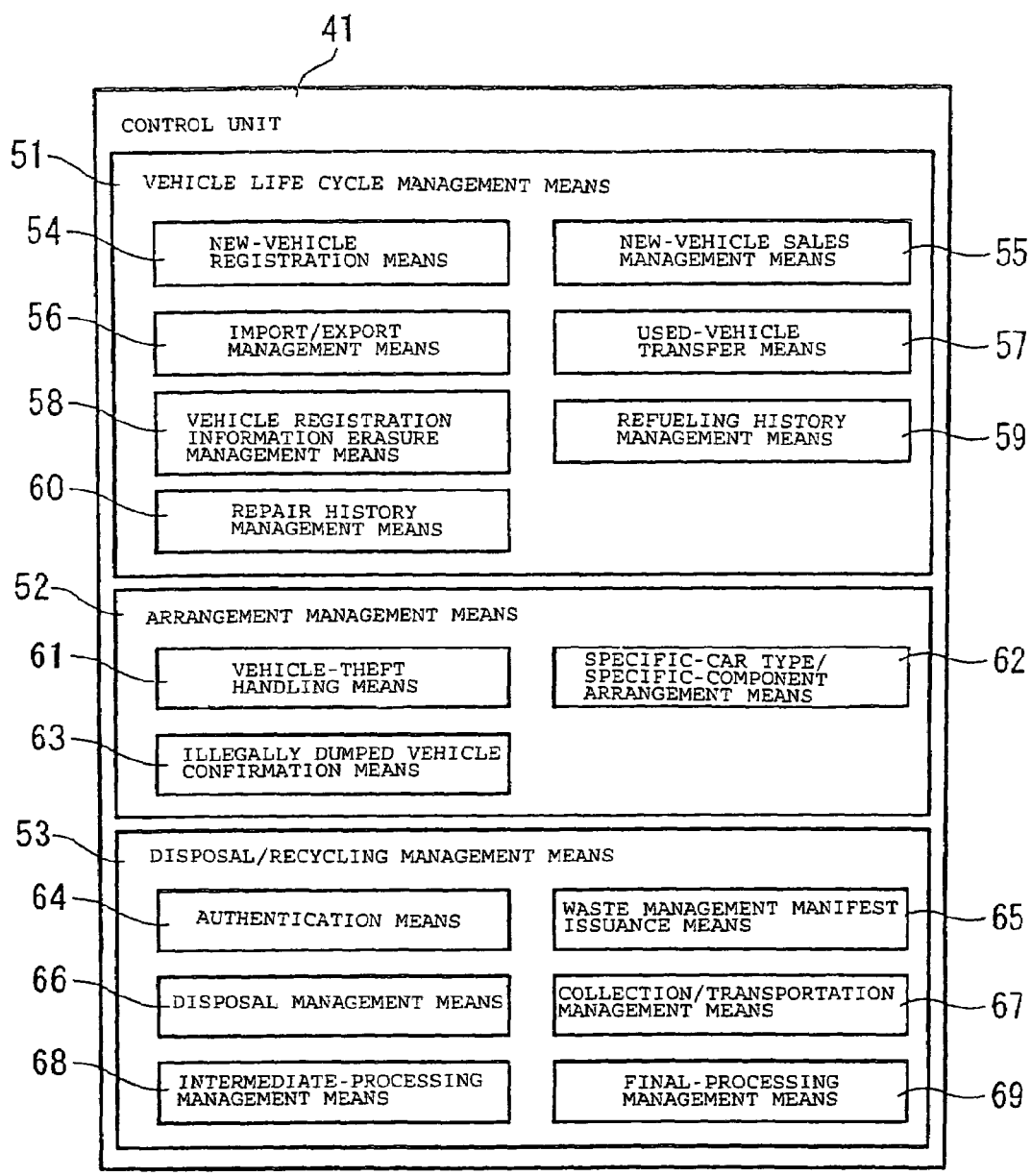
FIG. 11 is a diagram showing a control unit employed in a management server.

In addition, as shown in FIG. 11, the control unit 41 employed in the management server 4 activates predetermined programs to generally function as vehicle life cycle management means 51, arrangement management means 52 and disposal/recycling management means 53.

The vehicle life cycle management means 51 includes new-vehicle registration means 54, new-vehicle sales management means 55, import/export management means 56, used-vehicle transfer means 57, vehicle registration information erasure management means 58, refueling-history management means 59 and repair-history management means 60. The arrangement management means 52 includes vehicle-theft handling arrangement means 61, specific-car type/specific-component arrangement means 62 and illegally dumped vehicle confirmation means 63. The disposal/recycling management means 53 includes authentication means 64, waste management manifest issuance means 65, disposal management means 66, collection/transportation management means 67, intermediate-processing management means 68 and final-processing management means 69. The means mentioned above are described by mainly referring to FIGS. 1 and 11 as follows.

The new-vehicle registration means 54 carries out processing to receive information such as the vehicle ID of a new vehicle and component configuration data (see FIG. 8) of the new vehicle from the terminal 25 of a vehicle-manufacturing factory and catalog the data of the new vehicle in the vehicle-information database 15. In addition, the new-vehicle registration means 54 also creates information to be written into the IC tag 8 and information for creating a variety of cards 20 and 39, (see FIGS. 4 and 6, respectively). Furthermore, the new-vehicle registration means 54 creates a dealer database shown in none of the figures and catalogs information on dealers in the dealer database.

The new-vehicle sales management means 55 is means for cataloging a new owner of a vehicle at the time the vehicle is sold. The new-vehicle sales management means 55 carries out processing to receive information on the owner of a vehicle such as the name and address of the owner from the terminal 3 of a dealer, cataloging the information in the vehicle-information database 15 as owner data (see FIG. 7).

The import/export management means 56 carries out processing similar to a used-vehicle transfer to be described later on a motorcycle 2 when the motorcycle 2 is exported to or imported from another country.

The used-car transfer means 57 is means for cataloging the new owner of a vehicle when the vehicle is sold to the owner as a used vehicle. The used-car transfer means 57 carries out processing to receive information on the post-transfer new owner of a vehicle such as the name and address of the owner from the terminal 3 of a used-vehicle dealer. The used-car transfer means 57 then carries out processing to rewrite the data on the former owner with the data of the new owner and to additionally catalog the data in the vehicle history data (see FIG. 9).

The vehicle registration information erasure management means 58 is means for cataloging a disposal company, which is a company in charge when a motorcycle 2 is disposed and recycled. The vehicle registration information erasure management means 58 carries out processing to add information showing erasure of the registration of the motorcycle 2 to the vehicle history data. Then, the vehicle registration information erasure management means 58 carries out processing to catalog a first disposal company serving as a disposal-accepting company responsible for waste processing in the vehicle-information database 15.

The refueling-history management means 59 carries out processing to receive data on refueling from the terminal 26 of a gas-filling station and catalogs the data in the vehicle history data.

The repair-history management means 60 receives information on repair from the terminal 27 of a repair shop and catalogs the information in the vehicle history data. If a component is replaced in the repair, the component configuration data is updated.

The vehicle-theft handling arrangement means 61 carries out arrangement to handle a vehicle theft by using a vehicle ID when a motorcycle 2 is stolen. Information on the arrangement to handle a vehicle theft is transmitted to a tax office and to the terminals 26 and 27 of a gas-filling station and a repair shop, respectively. At these places, a vehicle ID is read out from an IC tag 8 and collated with a vehicle ID subjected to the arrangement to handle a vehicle theft. In this way, the location of the stolen vehicle can be found.

The specific-car type/specific-component arrangement means 62 carries out processing to inform an owner of information such as information on replacement of a component, information on vehicle inspection, information on checkups and information on a new version of control software. For example, after a predetermined period of time has lapsed since most recent replacement of a component, the postal or email addresses of the owner are acquired from the owner data for a motorcycle 2 and necessary information is transmitted to the addresses.

The illegally dumped vehicle confirmation means 63 searches the vehicle-information database 15 for the vehicle ID of an illegally dumped motorcycle 2, extracts information such as the registration status and owner of the motorcycle 2 and transmits the information to the terminals 3, 26 and 27 making an inquiry. If the registration of the motorcycle 2 has been erased or has been disposed and recycled, the state of waste processing and the state of recycling are traced from functions of a recycling system on the basis of data cataloged in the vehicle-information database 15.

The authentication means 64 is means for authenticating an owner, who makes a request for execution of a procedure for disposing and recycling a motorcycle 2, by determining whether the owner is the true owner of the motorcycle 2. If the management information stored in the IC tag 8 mounted on the motorcycle 2 matches the management information recorded in the management card 20 presented by the owner, the authentication means 64 authenticates the owner as the true owner of the motorcycle 2. In this case, the authentication means 64 outputs information allowing the disposal and recycling procedure to the dealer.

The waste management manifest issuance means 65 carries out processing to issue a waste management manifest. If a paper medium is used as a medium for creating the waste management manifest, the manifest is printed on the medium by using a printer shown in none of the figures. If an electronic medium such as a magnetic recording medium is used as a medium for creating the waste management manifest, on the other hand, the waste management manifest issuance means 65 carries out processing to write the data of the waste management manifest into the medium in an unrenewable state.

The disposal management means 66 carries out processing to read out the vehicle ID of a motorcycle 2 serving as a disposal/recycling object from the vehicle-information database 15, add disposal-acceptance information (including information on a disposal-accepting company) to the vehicle ID to create information for disposal acceptance and transmit the information to the disposal-accepting company. In addition, after the disposal-accepting company processes the motorcycle 2, information such as a processing date is added to the information for disposal acceptance before the information is sent back to the management server 4. Thus, the information for disposal acceptance can be stored in the vehicle-information database 15 as information on the disposal-accepting company.

The collection/transportation management means 67 carries out processing to read out information on a disposal-accepting company from the vehicle-information database 15, add collection/transportation information (including information on a collection/transportation company) to the information on a disposal-accepting company to create information for collection and transportation and transmit the information to a collection/transportation company. In addition, after the collection/transportation company processes the motorcycle 2, information such as a processing date is added to the information for collection and transportation before the information is sent back to the management server 4. Thus, the information for collection and transportation can be stored in the vehicle-information database 15 as information on the collection/transportation company.

The intermediate-processing management means 68 carries out processing to read out information on a collection/transportation company from the vehicle-information database 15, add intermediate-processing information (including information on an intermediate-processing company) to the information on a collection/transportation company to create information for intermediate processing and transmit the information to an intermediate-processing company. In addition, after the intermediate-processing company processes the motorcycle 2, information such as a processing date is added to the information for intermediate processing before the information is sent back to the management server 4. Thus, the information for intermediate processing can be stored in the vehicle-information database 15 as information on the intermediate-processing company.

The final-processing management means 69 carries out processing to read out information on an intermediate-processing company from the vehicle-information database 15, add final-processing information (including information on a final-processing company) to the information on an intermediate-processing company to create information for final processing and transmit the information to a final-processing company. In addition, after the final-processing company processes the motorcycle 2, information such as a processing date is added to the information for final processing before the information is sent back to the management server 4. Thus, the information for final processing can be stored in the vehicle-information database 15 as information on the final-processing company.

In this case, information transmitted from the terminal 5 of each of the disposal companies to the management server 4 is encrypted by using a public key managed by the disposal company. The management server 4 decrypts the encrypted information by using a secret key stored in the vehicle-information database 15. Thus, it is possible to prevent information from being interpolated by a third party in the course of transmission through the communication network 6 and prevent spoofing by the third party.

It is to be noted that a terminal 5 owned by a disposal company has a configuration similar to the terminal 3 of a dealer. In addition, a disposal-company card, on which an IC tag 8 is stuck, can be issued to each employee in charge of disposal business. Information stored in the IC tag 8 is used as information for identifying the company.

By the same token, the terminal 25 of a vehicle-manufacturing factory, the terminal 26 of a gas-filling station and the terminal 27 of a repair shop each have a configuration similar to the terminal 3 of a dealer. Since a vehicle-manufacturing factory and a management center pertain to the same manufacturing enterprise, the terminal 25 and the management server 4 can be connected to each other by an internal network of the enterprise.

By mainly referring to FIGS. 1, 4, 5 and 12, the following description explains processing carried out at a time a motorcycle 2 is sold. It is to be noted that information on the motorcycle 2 has been obtained from the terminal 25 of a vehicle-manufacturing factory and stored in the vehicle-information database 15. In addition, a dealer card 39 including a dealer ID stored thereon has been issued to the dealer.

Figure 12:
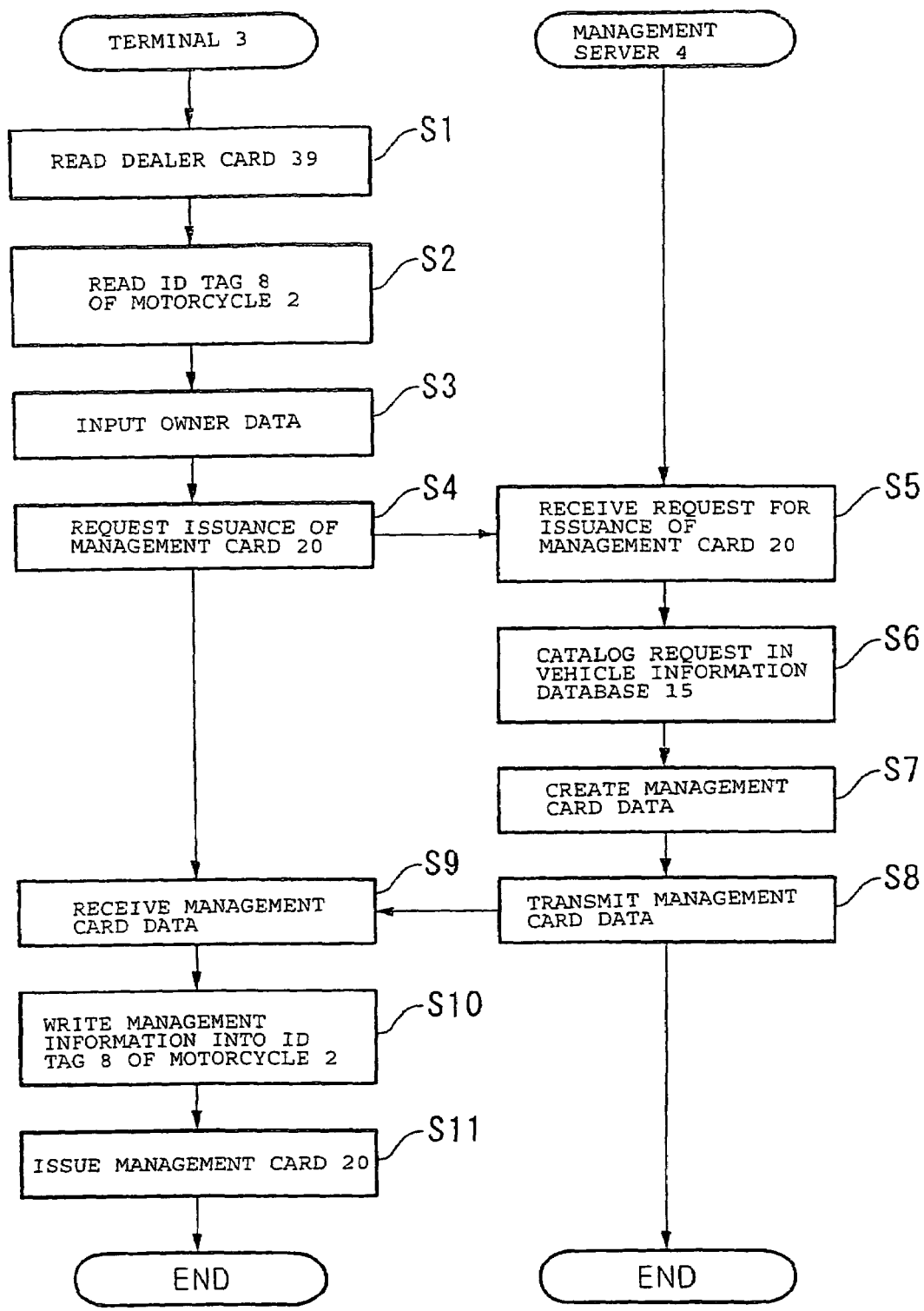
FIG. 12 shows a flowchart representing processing, which is carried out when a motorcycle is sold.

As shown in a flowchart of FIG. 12, the reader/writer 38 (see FIG. 5) employed in the terminal 3 reads out a dealer ID from the dealer card 39 when a motorcycle 2 is sold (step S1). Then, a reader/writer 38 is placed close to the seat unit 7 (see FIG. 1) employed in the motorcycle 2 to read out information (step S2).

Subsequently, information such as the name, birth data and address of a person desiring to purchase the motorcycle 2 is entered to the terminal 3 as owner data (step S3). Typically, the owner data is the same as information shown in an ID of the person such as a driver's license. The owner data is entered to the terminal 3 via a keyboard or a pointing device.

After a vehicle ID and the owner data have been entered to the terminal 3, a request to issue a management card 20 is transmitted to the management server 4 (step S4). Web data for data processing has been transmitted before from the management server 4 to the terminal 3. On the basis of the web data, a data-processing screen (not shown in the figures) is displayed on the terminal 3. A processing segment on the data-processing screen can be selected. Examples of the processing segment are a new-vehicle registration segment and an owner-change segment. In this case, the new-vehicle registration segment is selected. Then, the selected new-vehicle registration segment, a dealer ID, the vehicle ID and the owner data are processed in the terminal 3 before being transmitted to the address of the management server 4. The address of the management server 4 has been cataloged in advance in the terminal 3. Since the information transmitted to the management server 4 is private information, it is desirable to encrypt the information prior to transmission. The information can be encrypted and the encrypted information can be decrypted by using means similar to the secret and public keys cited earlier.

The management server 4 receives the request to issue a management card 20 (step S5). Then, the management server 4 catalogs the vehicle ID and the owner data associated with each other in the owner-data portion of the vehicle-information database 15. In addition, the owner data is cataloged in the owner-registration portion in the vehicle history data (step S6). After the owner data and the vehicle are cataloged, management-card data to be transmitted to the dealer is created (step S7). The management-card data includes information shown on the rows 20a to 20e of the management card 20 and the information recorded in the management-information area 20f of the management card 20 as shown in FIG. 4.

Then, the management-card data created at the management server 4 is transmitted to the terminal 3 identified by the dealer ID (step S8). The management-card data is also encrypted and decrypted by using secret and public keys.

When the dealer receives the management-card data (step S9), an image of a management card 20 created from the management-card data is displayed on the screen so that the contents of the management card 20 can be confirmed. Subsequently, the reader/writer 38 is placed closed to the seat unit 7 of the motorcycle 2 to write management information into the allowed-renewal area A2 (see FIG. 2) of the IC memory 12 included in the IC tag 8 (step S10). Then, at the next step S11, the terminal 3 prints a management card 20 and issues the management card 20 to the purchaser who becomes the owner of the motorcycle 2.

It is to be noted that processing similar to the one described above is carried out also when the ownership of the motorcycle 2 is transferred to another person. To put it in detail, the vehicle ID is read out from an IC tag 8 embedded in the motorcycle 2 at a used-vehicle dealer (step S2). Subsequently, owner data of the new owner is acquired (step S3). A processing segment (owner change) and the dealer ID assigned to the used-vehicle dealer are added to the above-mentioned data, and are transmitted to the management server 4 (step S4). The management server 4 replaces the owner data recorded in the vehicle-information database 15 with the information on the new owner (step S6). To put it concretely, the information on the new owner is added to the vehicle history data so that it becomes possible to verify the owners before and after the change. Then, management-card data including management information of the new owner is created (step S7) and transmitted to the terminal 3 (step S8). The terminal 3 writes the new management information into the IC tag 8 embedded in the motorcycle 2 (step S10) and a management card 20 is issued (step S11). The management card 20 of the former owner is collected and disposed since it can no longer be used.

Figure 13:
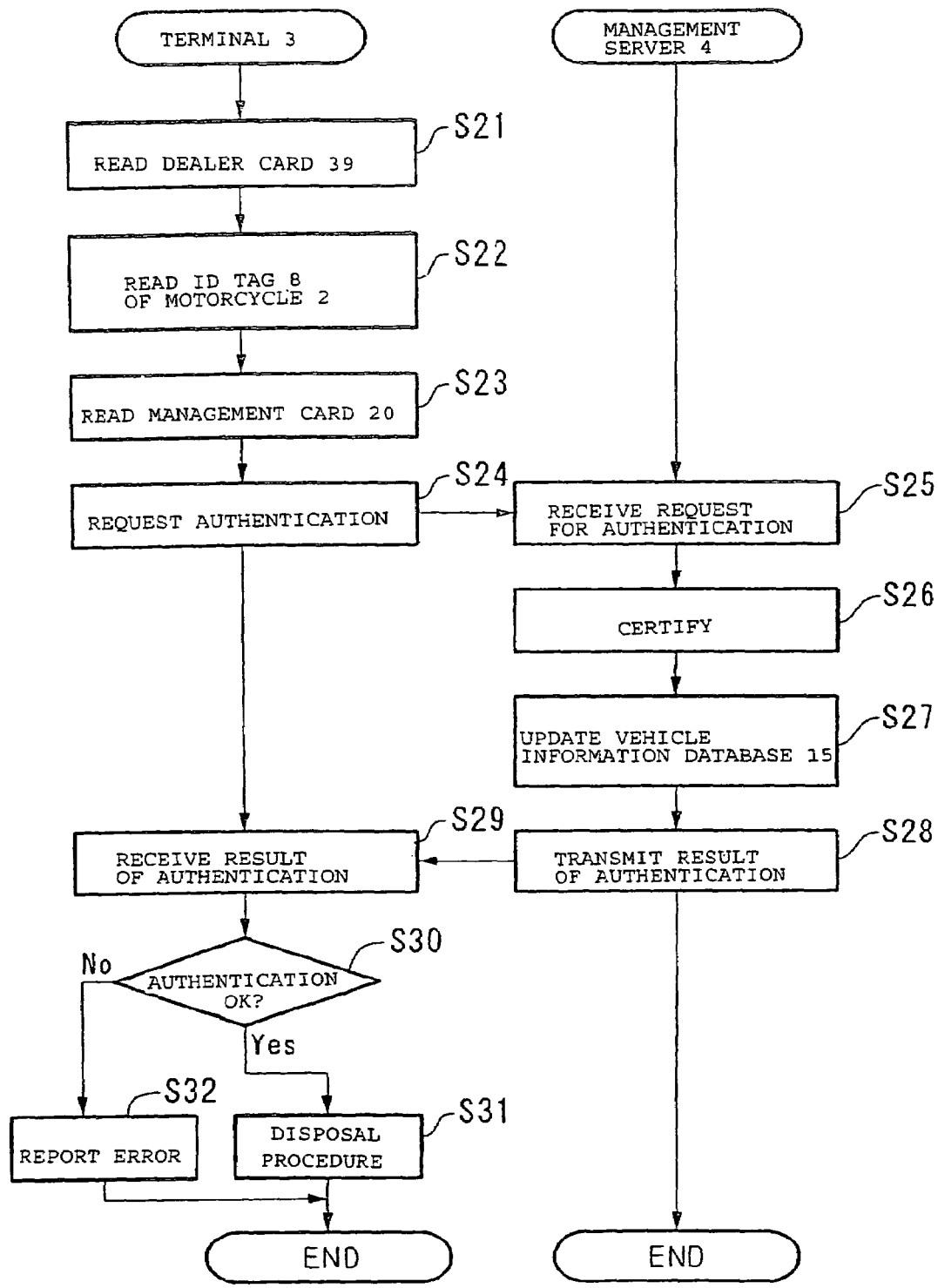
FIG. 13 shows a flowchart representing processing, which is carried out when a motorcycle is disposed and recycled.

By mainly referring to FIG. 1 and a flowchart shown in FIG. 13, the following description explains processing to dispose and recycle a motorcycle 2 by the owner.

The dealer, which is requested to dispose and recycle the motorcycle 2, reads out a dealer ID from a dealer card 39 using the reader/writer 38 (see FIG. 5) employed in the terminal 3 (step S21). Then, the reader/writer 38 is placed close to the seat unit 7 employed in the motorcycle 2 to read out information from an IC tag 8 embedded in the motorcycle 2 (step S22). Subsequently, information is read out from the management card 20 owned by the owner (step S23). The information can be read out from the management card 20 by using a barcode reader 37. If no barcode reader 37 is available, the information on the management card 20 can be directly entered to the terminal 3.

After information have been read out from the dealer card 39, the IC tag 8 embedded in the motorcycle 2 and the management card 20, a "disposal/recycling process" is selected as a processing segment and a request for authentication is transmitted to the management server 4 (step S24).

The management server 4 receives the request for authentication from the terminal 3 (step S25). Then, the authentication means 64 (see FIG. 11) authenticates a person desiring the disposal and the recycling as the true owner (step S26). To put it concretely, the authentication means 64 determines whether or not the management information (vehicle ID and the owner data) read out from the IC tag 8 embedded in the motorcycle 2 matches the management information read out from the management card 20. If both the pieces of management information match each other, the person desiring the disposal and the recycling is authenticated as the true owner. Otherwise, the person is not authenticated. In addition, management information can be collated with the vehicle ID, the owner data and so forth stored in the vehicle-information database 15 to determine whether or not they agree with each other.

If the person desiring the disposal and the recycling is authenticated as the true owner, the vehicle history data stored in the vehicle-information database 15 is updated (step S27). At that time, information such as "registration erasure" or "issuance of waste management manifest" is added to the vehicle history data. If the person desiring the disposal and the recycling is not authenticated as the true owner, on the other hand, the vehicle-information database 15 is not updated. Then, the result of the authentication is transmitted to the terminal 3 (step S28). It is to be noted that, if the person desiring the disposal and the recycling is authenticated as the true owner, a signal allowing a disposal/recycling procedure is transmitted to the terminal 3. If the person desiring the disposal and the recycling is not authenticated as the true owner, on the other hand, a signal disallowing the disposal/recycling procedure is transmitted to the terminal 3.

The terminal 3 receives the result of the authentication from the management server 4 (step S29). If the management server 4 has authenticated the person desiring the disposal and the recycling as the true owner ("Yes" in step S30), the disposal/recycling procedure is executed (step S31). To put it concretely, the manifest of the motorcycle 2 is printed. The printed manifest is given to the disposal company along with the management card 20. If the management server 4 did not authenticate the person desiring the disposal and the recycling as the true owner ("No" in step S30), on the other hand, an error message is output (step S32). In this case, the disposal/recycling procedure is not executed.

When the disposal/recycling procedure is executed, actual works are carried out in accordance with commands received from the management server 4. The works are carried out by collating information stored in the IC tag 8 embedded in the motorcycle 2 with information stored in the management card 20 attached to the waste management manifest. Information on the disassembling procedure and recyclable components can be confirmed by accessing to a component configuration database included in the management server 4 and by using vehicle IDs to refer to information stored therein. It is to be noted that examples of a recyclable component or a recyclable material are a fender, a cover, an aluminum frame and a material obtained as a result of shredding aluminum or iron parts. The disposal company feeds back such a component or material to the vehicle manufacturer to be used for making a new motorcycle 2.

In accordance with this embodiment, when a person purchases a motorcycle 2, the management server 4 associates information on the vehicle with information on the owner. The management server 4 provides management information to both the vehicle and the owner. It is thus possible to authenticate the owner as the true owner at the time of disposal/recycling. As a result, the motorcycle 2 can be disposed and recycled through a correct procedure with a high degree of reliability. In this case, since the management server 4 manages the information, the information can be prevented from being interpolated by a third party.

In addition, since a management card 20 for recording the management information is issued to the owner, the owner can be verified with ease. Since the management information including the information on the owner is also stored in the IC tag 8 embedded in the motorcycle 2, the owner can also be identified from the information recorded in this vehicle. In particular, if the motorcycle 2 is stolen or subjected to an incidence similar to a theft, the true owner can be identified quickly from the information stored in the IC tag 8 embedded in the motorcycle 2.

In addition, on the basis of information stored in the IC tag 8 embedded in a motorcycle 2 being disposed and recycled and information recorded in a management card 20, the vehicle-information database 15 (see FIGS. 1 and 10) can be searched for information on the disposal companies which process the motorcycle 2. Thus, the commodity management system provided by the present invention is also useful for prevention of illegal dumping or the like. In addition, since a vehicle-manufacturing company making the motorcycle 2 manages the management server 4, it is possible to reliably obtain information on the recycling process and information on prior removal of a hazardous material. Since the vehicle-manufacturing company can catalog information in the vehicle-information database 15 even after a motorcycle 2 is sold, a disposal company is capable of always carrying out a disposal/recycling process on the basis of most recent information.

Next, a second embodiment is explained in detail by referring to diagrams. It is to be noted that every element identical with its counterpart employed in the first embodiment is denoted by the same reference numeral and its description is not given to avoid redundancy.

Figure 14:
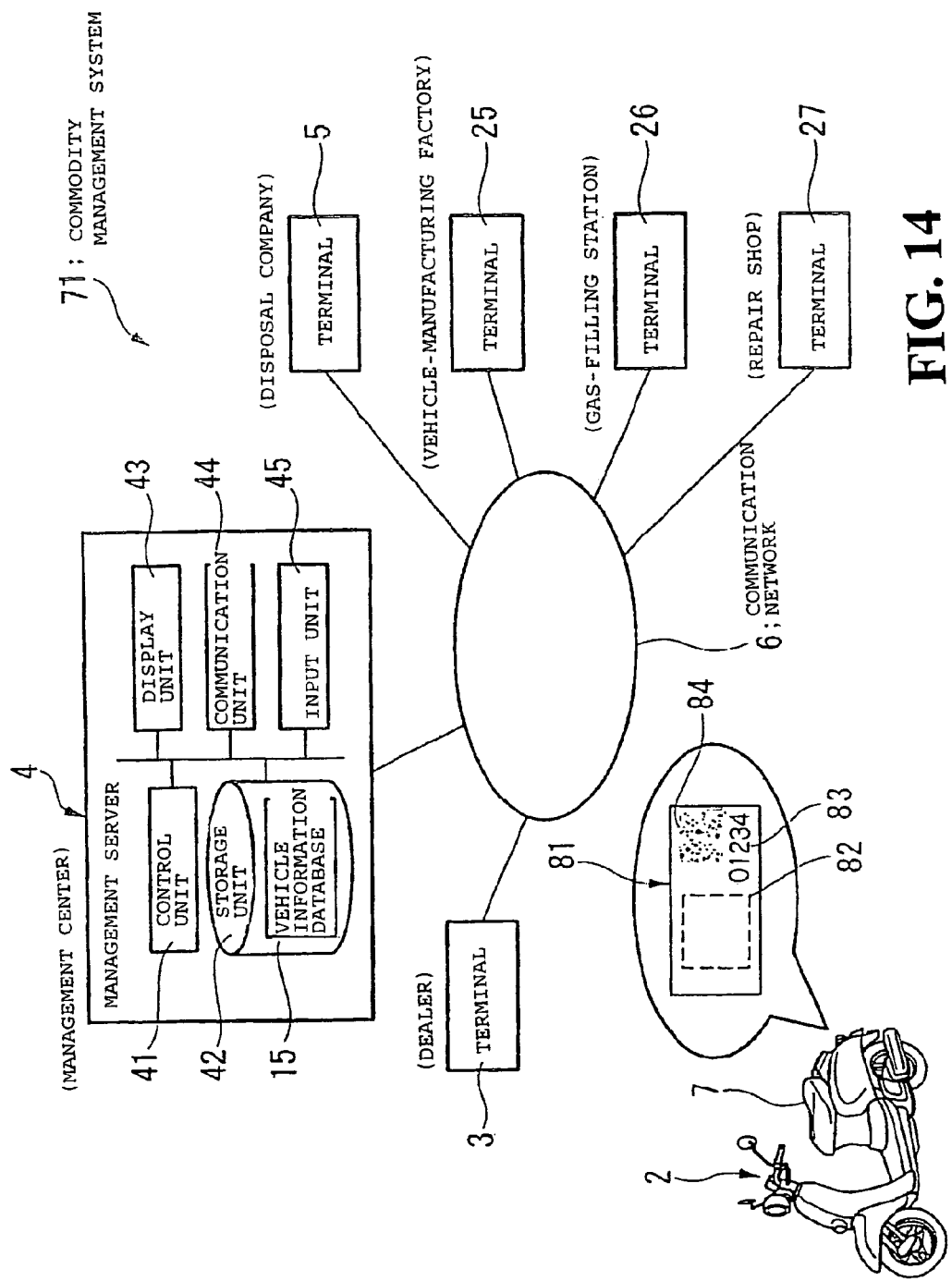
FIG. 14 is a diagram showing the overall configuration of a commodity management system implemented by another embodiment of the present invention.

As shown in FIG. 14, a commodity management system 71 implemented by this embodiment is characterized in that the commodity management system 71 has a configuration in which the terminals 3, 5, 25, 26 and 27 of a dealer and others are connected to the management server 4 through the communication network 6. The system is also characterized in that a recycle mark 81 is attached to the motorcycle 2 as a mark for indicating that a fee required for disposing and recycling the motorcycle 2 has been paid.

The recycle mark 81 is a label stuck, for example, on the front cowl or the inner wall of an accommodation box under the sheet. The recycle mark 81 includes a predetermined mark 82, a display column 83 for the recycle mark ID (management information) and a display section 84 for a 2-dimensional code or a barcode. The recycle mark ID is assigned to each recycle mark 81. The recycle mark ID can be read out by any of the terminals 3, 5, 25, 26 and 27 using the 2-dimensional code or a barcode.

As means for indicating that a person is the owner of a motorcycle 2, a management card 20 shown in FIG. 4 is issued to the person. The management card 20 has rows 20a to 20e and a management-information area 20f on which the same code as the 2-dimensional code or the barcode printed in the above-mentioned display section 84 is printed. The management card 20 is issued by the terminal 3 of a dealer when a motorcycle 2 is purchased at the dealer.

The terminal 3 of a dealer has substantially the same configuration as the terminal like the one shown in FIG. 5. As shown in the figure, the terminal 3 includes a control unit 31, a storage unit 32, a communication unit 33, a display unit 34, an input unit 35, output means 36 and a barcode reader 37 for reading the barcode of a recycle ID.

It is to be noted that the other terminals 5, 25, 26 and 27 have the same configuration as the terminal 3.

Figure 15:
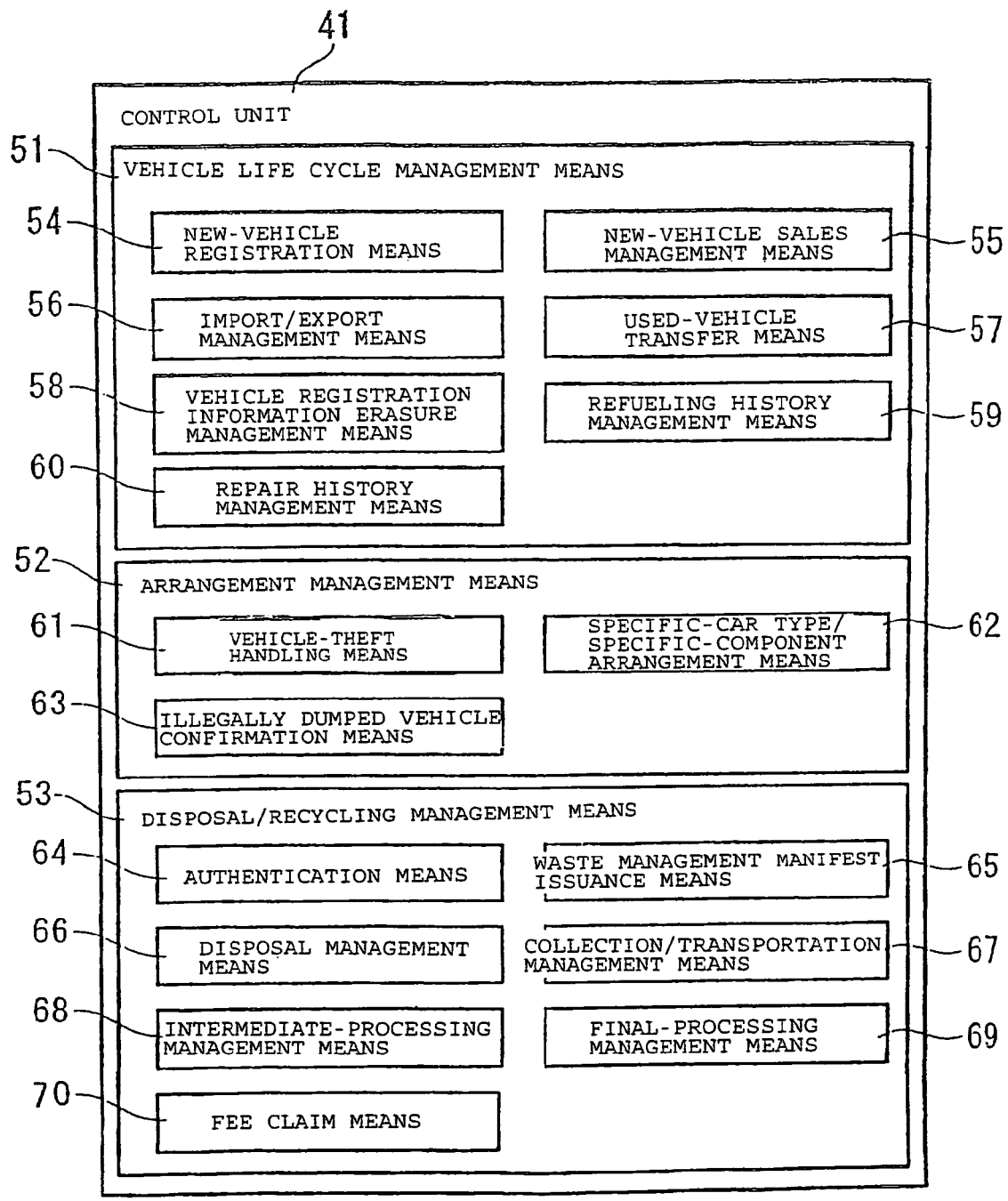
FIG. 15 is a diagram showing a control unit employed in a management server.

The management center shown in FIG. 14 is managed by the manufacturer of the motorcycle 2 to play the roles of facilities for managing and authenticating various kinds of information. The management server 4 of the management center is a computer including a vehicle-information database 15 for storing various kinds of data shown in FIGS. 7 to 10. In the vehicle-information database 15 provided by this embodiment, in place of the vehicle ID, the recycle ID or a combination of the vehicle ID and the recycle ID is used. As shown in FIG. 15, the new-vehicle registration means 54 employed in the control unit 41 carries out processing to generate information for creating a management card 20 and processing to associate a recycle ID with a vehicle ID and associate a recycle ID with owner data. In addition, the disposal/recycling management means 53 includes fee claim means 70 for issuing an expense bill to the owner of a motorcycle 2 when the motorcycle 2 is disposed and recycled if the motorcycle 2 does not have the recycle mark 81 (see FIG. 14).

Figure 16:
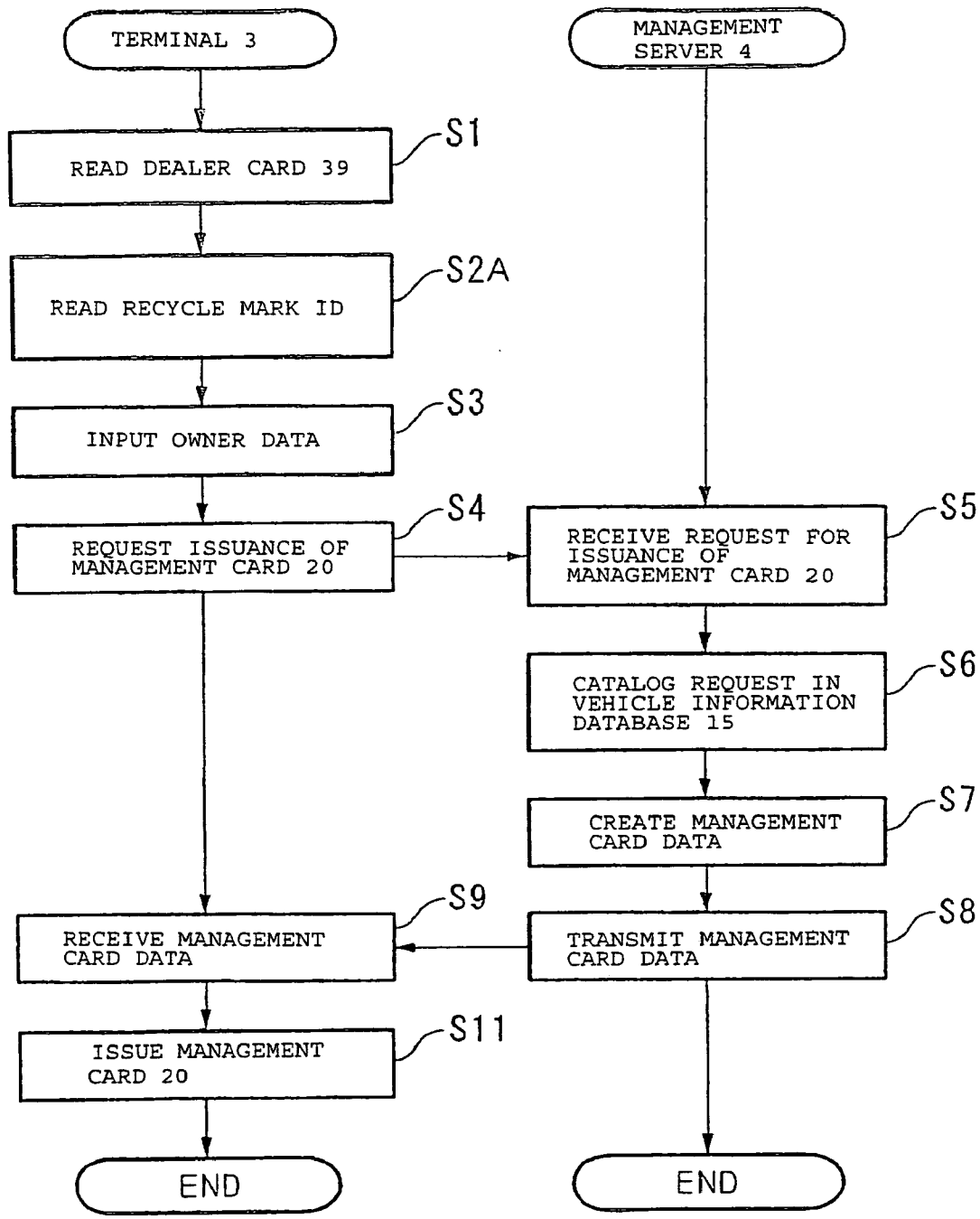
FIG. 16 shows a flowchart representing processing, which is carried out when a motorcycle is sold.

By referring to FIGS. 14 and 16, the following description explains processing, which is carried out in accordance with this embodiment when a motorcycle 2 is sold. It is to be noted that, at a vehicle-manufacturing factory, a recycle mark 81 is attached to the motorcycle 2 and registered in the vehicle-information database 15 through the terminal 25.

Information is fetched from the dealer card 39 at a dealer (step S1). Then, a barcode reader 37 fetches a recycle mark ID of the motorcycle 2 (step S2A). At that time, a vehicle-body number printed on the vehicle body and the vehicle ID may also be fetched as well.

Subsequently, information such as the name, birth data and address of a person desiring to purchase the motorcycle 2 is entered to the terminal 3 as owner data (step S3).

After at least the recycle mark ID has been entered, a request to issue a management card 20 is transmitted to the management server 4 (step S4).

When the management server 4 receives the request to issue a management card 20 (step S5), the management server 4 updates the vehicle-information database 15 (step S6). Subsequently, the management sever 4 creates management-card data (step S7) and the management-card data is transmitted to the terminal 3 (step S8).

The dealer receives the management-card data (step S9) and the terminal 3 issues a management card 20 to the purchaser of the motorcycle 2 (step S11).

Figure 17:
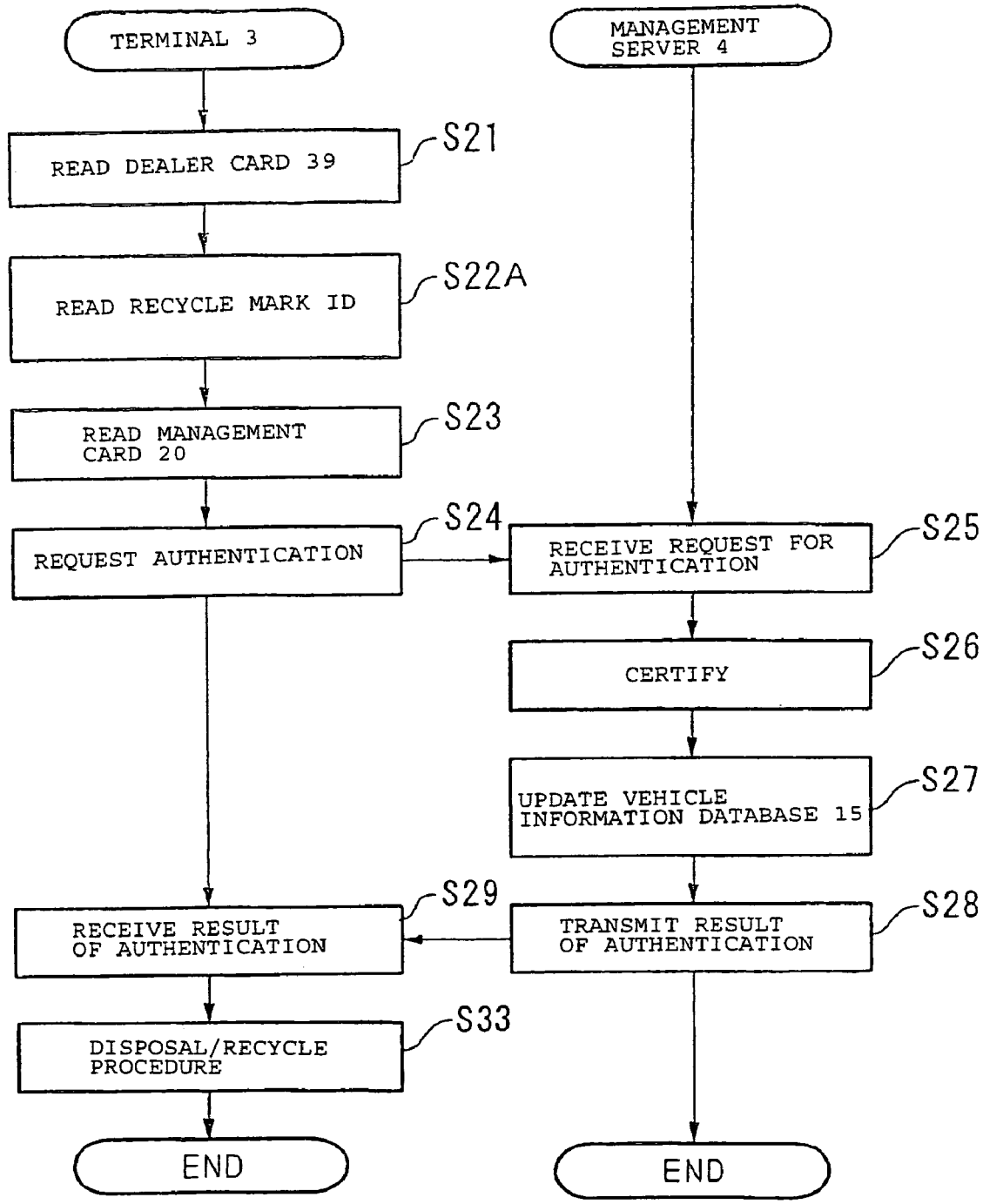
FIG. 17 shows a flowchart representing processing, which is carried out when a motorcycle is disposed and recycled.

Next, processing to dispose and recycle a motorcycle 2 is explained by mainly referring to FIG. 14 and a flowchart shown in FIG. 17.

The barcode reader 37 employed in the terminal 3 reads out information from a dealer card 39 at a dealer receiving a request for disposal/recycling of a motorcycle 2 (step S21). The barcode reader 37 further reads out a recycle mark ID of the recycle mark 81 provided on the vehicle (step S22A). Subsequently, management information is read out from the management-information area 20f of the management card 20 (step S23). Then, a request for authentication is transmitted to the management server 4 (step S24).

When the management server 4 receives the request for authentication from the terminal 3 (step S25), the authentication means 64 (see FIG. 15) authenticates a person desiring the disposal and the recycling as the true owner (step S26). Subsequently, the management server 4 updates the vehicle-information database 15 (step S27). Then, the result of the authentication is transmitted to the terminal 3 (step S28). It is to be noted that, if the person desiring the disposal and the recycling is authenticated as the true owner, a signal allowing a disposal/recycling procedure without requesting a new disposal/recycling fee is transmitted to the terminal 3. If the person desiring the disposal and the recycling is not authenticated as the true owner, that is, if the recycle mark ID of the recycle mark 81 does not match that of the management card 20, on the other hand, a signal allowing the disposal/recycling procedure at a disposal/recycling fee is actually transmitted to the terminal 3.

The terminal 3 at the dealer receives the result of the authentication (step S29) and executes the disposal/recycling procedure (step S33). If the person desiring the disposal and the recycling is authenticated as the true owner, the disposal/recycling procedure can be executed without the need for the owner of the motorcycle 2 to pay the disposal/recycling fee. If the person desiring the disposal and the recycling is not authenticated as the true owner, on the other hand, a signal allowing the disposal/recycling procedure at a disposal/recycling fee is transmitted to the terminal 3. Thus, the disposal/recycling procedure is executed only if the owner agrees to pay the disposal/recycling fee.

In the case of this embodiment, if no recycle mark 81 is attached to a motorcycle 2, the authentication procedure for the motorcycle 2 cannot be executed. In this case, at the dealer, the vehicle ID or the vehicle number and the owner data are entered to the terminal 3 to be transmitted to the management server 4. The management server 4 then catalogs the vehicle ID or the vehicle number and information on the owner in the vehicle-information database 15. Subsequently, the management server 4 transmits a signal allowing the disposal/recycling procedure at a disposal/recycling fee to the terminal 3. The dealer attaches a waste management manifest to the motorcycle 2 and starts a disposal/recycling process. Each disposal company transmits information on an expense for transporting, disposing and recycling the motorcycle 2 from the terminal 5 to the management server 4 along with the vehicle ID or the vehicle number. The fee claim means 70 employed in the management server 4 sums up the expenses received from the disposal companies carrying out all disposal/recycling processes including the final processing of the motorcycle 2. To put it concretely, if a bill of the expense sum is to be sent to the owner through the dealer receiving the request for the disposal and the recycling of the motorcycle 2, information associating the expense sum with the owner is transmitted from the management server 4 to the terminal 3 of the dealer. If a bill of the expense sum is to be sent to the owner directly from the management center, on the other hand, the fee claim means 70 issues the bill to the owner.

In accordance with this embodiment, by using a recycle mark 81 attached to a motorcycle 2, disposal and recycling processes can be managed in a simple configuration. In particular, since it is no longer necessary to incorporate a special device in the vehicle, the manufacturing cost can be reduced. In addition, a special reader is not required in the terminals 3, 5, 25, 26 and 27 of the dealer and other offices and factories.

Further, the fee claim means 70 sums up expenses required to dispose and recycle a motorcycle 2 on which no recycle mark 81 is attached or a motorcycle 2 with the owner thereof failing in the authentication process so that the sum of the expenses can be charged to the owner. Thus, a bill of the expense sum can be sent to the owner with a high degree of reliability. As a result, requests for disposal and recycling can be accepted for all motorcycles 2.

In addition, much like the first embodiment, it is possible to avoid and discourage thefts, manage vehicle histories, prevent illegal waste dumping and make disposal and recycling processes more efficient.

It is to be noted that the scope of the present invention is not limited to the embodiments described above. For example, the vehicle serving as an object of disposal and recycling can be another kind of bicycle, a three-wheel car and a four-wheel car in addition to the motorcycle 2. Since these types of vehicles may be resold as a used product, entailing an owner change, the commodity management system 1 is appropriate for managing such vehicles. However, the object of disposal and recycling is not limited to vehicles. That is to say, the object of disposal and recycling can be an electrical home product or an appliance such as a TV, a refrigerator or an air conditioner.

The management server 4 shown in FIG. 1 is an apparatus managed and operated by a manufacturer. However, a third-party can also serve as a management server having a vehicle-information database 15 for products made by a plurality of manufacturers. For a dealer which handles commodities having a plurality of types and are made by a plurality of manufacturers, and for a disposal/recycling company, the authentication process and other processing become simpler.

In addition, the management information may have a data structure including only owner data or including the owner data, a vehicle ID and vehicle history data.

The management card 20 and the dealer card 39 shown in FIGS. 4 and 6, respectively may be any form as long as the card can record predetermined information and is a portable medium. The examples of the medium are a magnetic recording medium mountable on the terminal 3, a portable computer terminal or the like. In addition, the management-information area 20*f* on the management card 20 can be an IC tag described earlier. Further, a 2-dimensional code or a barcode can be used in place of the IC tag 39*f* of the dealer card 39.

Furthermore, the fee claim means 70 provided by the second embodiment can also be provided in the management server 4 of the first embodiment as means for accepting a request for disposal/recycling at a disposal/recycling fee in the case of a motorcycle 2 on which no IC tag 8 is attached and a motorcycle 2 with the owner thereof failing in the authentication process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A commodity management system for managing commodities that are purchased by consumers, from a commodity-selling time to a commodity-disposal time, said commodity management system comprising:

authentication means for reading out management information stored in a management card issued at the commodity-selling time as well as management information recorded at said commodity-selling time in a storage device provided for a commodity and carrying out authentication by comparing said management information read out from said management card with said management information read out from said storage device, the storage device being attached to the commodity, wherein said commodity management system outputs information that allows a disposal and recycling procedure for the commodity when said management information read out from said storage device matches said management information stored in said management card.

2. The commodity management system according to claim 1, wherein said authentication means is included in an information-processing apparatus of a commodity manufacturer manufacturing the commodity.

3. The commodity management system according to claim 2, wherein the commodity is a vehicle.

4. The commodity management system according to claim 1, wherein the commodity is a vehicle.

5. The commodity management system according to claim 1, wherein the storage device stores management information indicating that a purchaser of the commodity has paid a disposal and recycling fee.

6. The commodity management system according to claim 5, wherein said commodity management system outputs information allowing a disposal and recycling procedure without issuing a request for a disposal and recycling fee for a commodity having management information in the storage device of the commodity matching said management information stored in said management card, and said commodity management system issues a notification requesting a disposal and recycling fee for a commodity not authenticated successfully.

7. A commodity management system, wherein a label showing that a purchaser of a commodity has paid a disposal and recycling fee for a commodity is attached to the commodity at a time the purchaser purchases the commodity, and commodities purchased by consumers are managed from a commodity-selling time to a commodity disposal time, said commodity management system comprising:

authentication means for reading out management information stored in a management card issued at the commodity-selling time of the commodity as well as management information shown on the label attached to the commodity and carrying out authentication by comparing said management information read out from said management card with said management information shown on the label of the commodity, wherein said commodity management system outputs information allowing a disposal and recycling procedure without issuing a request for a disposal and recycling fee for a commodity having management information shown on the label of the commodity matching said management information stored in said management card, and wherein said commodity management system issues a notification requesting a disposal and recycling fee for a commodity not authenticated successfully or a commodity having no label.

8. The commodity management system according to claim 7, wherein said authentication means is included in an information-processing apparatus of a commodity manufacturer manufacturing the commodity.

9. The commodity management system according to claim 8, wherein the commodity is a vehicle.

10. The commodity management system according to claim 7, wherein the commodity is a vehicle.

11. A method of managing commodities that are purchased by consumers, from a commodity-selling time to a commodity-disposal time, said method comprising the steps of:

reading out management information stored in a management card issued at the commodity-selling time as well as management information recorded at said commodity-selling time in a storage device provided for a commodity, the storage device being attached to the commodity;

carrying out authentication by comparing said management information read out from said management card with said management information read out from said storage device; and outputting information that allows a disposal and recycling procedure for the commodity when said management information read out from said storage device matches said management information stored in said management card.

12. The method according to claim 11, wherein said authentication means is included in an information-processing apparatus of a commodity manufacturer manufacturing the commodity.

13. The method according to claim 12, wherein the commodity is a vehicle.

14. The method according to claim 11, wherein the commodity is a vehicle.

15. The method according to claim 11, wherein the storage device stores management information indicating that a purchaser of the commodity has paid a disposal and recycling fee.

16. The method according to claim 15, further comprising the step of outputting information allowing a disposal and recycling procedure without issuing a request for a disposal and recycling fee for a commodity having management information in the storage device of the commodity matching said management information stored in said management card, and issuing a notification requesting a disposal and recycling fee for a commodity not authenticated successfully.

17. A method of managing commodities, wherein a label showing that a purchaser of a commodity has paid a disposal and recycling fee for a commodity is attached to the commodity at a time the purchaser purchases the commodity, and commodities purchased by consumers are managed from a commodity-selling time to a commodity disposal time, said method comprising the steps of:

reading out management information stored in a management card issued at the commodity-selling time of the commodity as well as management information shown on the label attached to the commodity;

carrying out authentication by comparing said management information read out from said management card with said management information shown on the label of the commodity;

outputting information allowing a disposal and recycling procedure without issuing a request for a disposal and recycling fee for a commodity having management information shown on the label of the commodity matching said management information stored in said management card; and issuing a notification requesting a disposal and recycling fee for a commodity not authenticated successfully or a commodity having no label.

18. The method according to claim 17, wherein said authentication means is included in an information-processing apparatus of a commodity manufacturer manufacturing the commodity.

19. The method according to claim 18, wherein the commodity is a vehicle.

20. The method according to claim 17, wherein the commodity is a vehicle.

* * * * *